(12) United States Patent
Gasselsdorfer et al.

(10) Patent No.: US 10,767,579 B2
(45) Date of Patent: Sep. 8, 2020

(54) MONITORING THE FUNCTION OF SOLENOID VALVES FOR FUEL INJECTION SYSTEMS

(71) Applicant: Robert Bosch GmbH, Stuttgart (DE)

(72) Inventors: Claudia Gasselsdorfer, Linz (AT); Peter Christiner, Linz (AT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/335,301

(22) PCT Filed: Aug. 7, 2017

(86) PCT No.: PCT/EP2017/069938
§ 371 (c)(1),
(2) Date: Mar. 21, 2019

(87) PCT Pub. No.: WO2018/054594
PCT Pub. Date: Mar. 29, 2018

(65) Prior Publication Data
US 2020/0018249 A1 Jan. 16, 2020

(30) Foreign Application Priority Data
Sep. 22, 2016 (DE) ........................ 10 2016 218 278

(51) Int. Cl.
*F02D 19/02* (2006.01)
*F02D 41/14* (2006.01)
(Continued)

(52) U.S. Cl.
CPC ....... *F02D 41/0027* (2013.01); *F02D 19/024* (2013.01); *F02D 19/025* (2013.01);
(Continued)

(58) Field of Classification Search
CPC ............. F02D 41/0027; F02D 41/1401; F02D 41/144; F02D 41/221; F02D 41/222;
(Continued)

(56) References Cited

U.S. PATENT DOCUMENTS

| 4,452,210 A | * | 6/1984 | Sasayama | ............... F02D 41/20 123/490 |
| 2006/0124173 A1 | * | 6/2006 | An | ........................ G05D 7/0635 137/487.5 |

(Continued)

FOREIGN PATENT DOCUMENTS

| DE | 102005059062 | 6/2007 |
| DE | 102008041528 | 3/2010 |

(Continued)

OTHER PUBLICATIONS

International Search Report for Application No. PCT/EP2017/069938 dated Nov. 6, 2017 (English Translation, 3 pages).

*Primary Examiner* — Mahmoud Gimie
(74) *Attorney, Agent, or Firm* — Michael Best & Friedrich LLP

(57) ABSTRACT

The invention relates to a method (100) for operating a solenoid valve (1) for metering a fuel (2) in a fuel injection system (3). The solenoid valve can be actuated against a restoring force (12) by an electromagnet (11), wherein •the time curve l(t) of the current I flowing through the electromagnet (11) and/or the time curve U(t) of the voltage U applied to the electromagnet (11) are detected during at least one opening process of the solenoid valve (1). The opening time $t_{ON}$ and the closing time $t_{OFF}$ of the solenoid valve (1) are evaluated (110) from the time curve I(t) and/or U(t), and the actual opening duration $T_T = t_{OFF} - t_{ON}$ of the solenoid valve (1) is compared (140) with a reference value $T_R$ and/or •the mass flow dm/dt flowing through the solenoid valve (1) is detected (120) and compared (142) with a reference value
(Continued)

$M_R$ during at least one opening process of the solenoid valve (1); and/or a leakage $dm'/dt$ of fuel (2) through the solenoid valve (1) is detected (130) in the closed state of the solenoid valve (1). The invention also relates to a corresponding controller (5), a fuel injection system (3), and a computer program product.

15 Claims, 3 Drawing Sheets

(51) Int. Cl.
*F02M 21/02* (2006.01)
*F02D 41/00* (2006.01)
*F02D 41/22* (2006.01)
*F02D 41/40* (2006.01)
*F02D 41/20* (2006.01)

(52) U.S. Cl.
CPC ....... *F02D 19/029* (2013.01); *F02D 41/1401* (2013.01); *F02D 41/144* (2013.01); *F02D 41/221* (2013.01); *F02D 41/222* (2013.01); *F02D 41/401* (2013.01); *F02M 21/023* (2013.01); *F02D 2041/1433* (2013.01); *F02D 2041/2055* (2013.01); *F02D 2041/2058* (2013.01); *F02D 2041/225* (2013.01); *F02D 2200/0614* (2013.01)

(58) Field of Classification Search
CPC .... F02D 41/401; F02D 19/025; F02D 19/029; F02D 2041/1433; F02D 2041/2055; F02D 2041/2058; F02D 2041/225; F02D 2200/0614; F02M 21/023
USPC .......................................... 701/104; 123/490
See application file for complete search history.

(56) References Cited

U.S. PATENT DOCUMENTS

| | | | |
|---|---|---|---|
| 2015/0000641 A1 | 1/2015 | Mitter et al. | |
| 2016/0102779 A1 | 4/2016 | Lang et al. | |
| 2016/0177855 A1* | 6/2016 | Kusakabe | F02M 51/0685 |
| | | | 123/490 |
| 2016/0237937 A1* | 8/2016 | Kusakabe | F02D 41/20 |

FOREIGN PATENT DOCUMENTS

| | | |
|---|---|---|
| DE | 102013211464 | 12/2014 |
| DE | 102013212191 | 12/2014 |
| DE | 102014220795 | 4/2016 |
| EP | 2915985 | 9/2015 |
| GB | 2534201 | 7/2016 |
| JP | S57137783 A | 8/1982 |
| JP | S60252225 A | 12/1985 |
| JP | H04187845 A | 7/1992 |
| JP | 2009264237 A | 11/2009 |
| JP | 2012132418 | 7/2012 |
| WO | 2006104176 A1 | 10/2006 |

* cited by examiner

MONITORING THE FUNCTION OF SOLENOID VALVES FOR FUEL INJECTION SYSTEMS

BACKGROUND OF THE INVENTION

The present invention relates to the operation of solenoid valves for fuel in fuel injection systems, especially in the field of heavy-duty engines.

In injection systems for engines that are operated using a gaseous fuel, the fuel is generally metered using electromagnetically actuated gas valves. If the electromagnet is energized, a group of valve plates is moved counter to a return force exerted by one or more springs and opens up one or more flow-through openings. For closure purposes, the current is switched off. The group of valve plates is then pressed back onto the fixed valve seat, such that the valve is closed. This is what is known as a "normally closed" valve that is closed in the non-energized state, and in the process is ideally completely sealtight. Such valves are known for example from DE 10 2013 212 191 A1.

The lifetime of such a valve is typically a few hundred million load alternations. The main reason for the end of lifetime is a wear-induced undesired and uncontrolled increase in the injected amount of fuel, this being caused by two effects: the wear firstly reduces the residual air gap, such that the switch-off time increases. Secondly, the wear increases the stroke, such that the flow resistance of the valve is reduced. Another reason for the end of lifetime of a valve may be lack of sealtightness with respect to the intake manifold of the fuel injection system, which arises due to the wear in the region of the sealing faces between valve seat and valve plate.

DE 10 2014 220 795 A1 discloses a method for operating a solenoid valve injector in which wear-induced early closure is determined from the voltage signal of the electromagnet and is compensated by increasing the drive current for the electromagnet.

SUMMARY OF THE INVENTION

In the context of the invention, a method for operating a solenoid valve for metering a fuel in a fuel injection system has been developed. In this case, the solenoid valve is able to be actuated counter to a return force by an electromagnet.

According to the invention, one or more of the following measures are now taken:
at at least one opening of the solenoid valve, the temporal profile I(t) of the current I flowing through the electromagnet and/or the temporal profile U(t) of the voltage U applied to the electromagnet is detected. From the temporal profile I(t) and/or U(t), the opening time $t_{ON}$ and the closure time $t_{off}$ of the solenoid valve are evaluated. The actual opening duration $T_T = t_{OFF} - t_{ON}$ of the solenoid valve is compared with a reference value $T_R$; and/or
at at least one opening of the solenoid valve, the mass flow dm/dt through the solenoid valve is detected and compared with a reference value $M_R$; and/or
in the closed state of the solenoid valve, a leakage dm'/dt of fuel passing through the solenoid valve is detected.

Since there is complete control over the opening duration $T_T$, that is to say in particular the opening time $t_{ON}$ is also detected, a situation whereby an excessive amount of fuel is metered in is in particular able to be avoided. This could lead to engine knocking. Although, in the case of automobile engines, it is sufficient to recognize that the knocking limit is exceeded by way of a knocking sensor and immediately counteract this, it is necessary, precisely in the case of heavy-duty engines, as used for instance for generating power or as main or auxiliary unit on ships, to imperatively avoid any exceedance of the knocking limit: the heavy-duty engine "memorizes" the mechanical overload caused by each knock, and, due to its lifetime, which is substantially longer in comparison with automobile engines, there is a high probability that the allowance in relation to this will run out at some point and the engine will fail without prior warning. Since money is generally earned through the use of heavy-duty engines, such failures are extremely costly and may also be dangerous, for instance if a ship is no longer able to maneuver.

Due to the longer lifetime of heavy-duty engines and the significantly larger sizes of the solenoid valves that are used, significantly greater wear on the solenoid valves is on the whole expected. Therefore, the effect that the stroke of the solenoid valve increases due to the wear and then for its part increases the mass flow dm/dt is also significantly more relevant than in the case of automobile engines.

Ultimately, the leakage dm'/dt in the closed state should also be avoided notably in the case of heavy-duty engines, since an amount of fuel that is introduced into the intake manifold without knowledge of the engine controller enters the combustion chamber as excess at the next intake and may lead to the knocking limit being exceeded there.

The measures that are taken according to the invention therefore especially make the operation of gas-operated heavy-duty engines more secure. Since the state of the solenoid valves is closely monitored, it is no longer necessary to perform a preventive exchange at fixed operating time intervals. Rather than this, maintenance may take place independently of state, such that the costs of the maintenance itself and for downtimes are able to be reduced.

As an alternative or in combination with the detection by way of I(t) and/or U(t), the opening time $T_T$ of the solenoid valve may also be detected for example by way of an acceleration sensor or structure-borne noise sensor that records the armature impacting at its end position. The sensor system that is already present in the engine controller may be used to detect I(t) and U(t). However, additional sensors may also be used, such as for example a Hall sensor, by way of which the magnetic field of the electromagnet, and therefore I(t), are able to be monitored. In general, it is possible to use any sensors and measurement principles by way of which it is possible to directly or indirectly conclude as to the valve state and/or the valve behavior.

Once a wear-induced change in the actual opening duration $T_T$ and/or in the mass flow dm/dt has been detected, it is then able to be compensated by changing the driving of the solenoid valve within certain limits. The valve then behaves roughly like a new valve and is accordingly able to be used for longer.

Therefore, in one particularly advantageous refinement of the invention, a difference in the actual opening duration $T_T$ and/or in the mass flow dm/dt with respect to the respective reference value $T_R$ and/or $M_R$ is compensated and/or corrected by changing the current temporal profile u(t) applied to the electromagnet and/or the voltage temporal profile i(t) applied to the electromagnet.

Knowledge of the leakage dm'/dt has the effect that the valve is able to be operated until a defined leakage limit value is actually reached. According to the previous prior art, that is to say without this knowledge, the valve already had to be exchanged after a time, determined beforehand in the context of the validation, at which there was definitely not yet any leakage. This time was necessarily before the actual end of life of the valve, such that a certain period of lifetime always remained unused.

In one particularly advantageous refinement of the invention, a degree of wear W of the solenoid valve, which influences the mass flow dm/dt, is additionally evaluated from the temporal profile I(t) and/or U(t). The inventors have recognized that every closure that influences the mass flow dm/dt to a relevant degree also influences the armature movement of the solenoid valve. The influence on the armature movement in turn generates characteristic current and voltage signals in the magnetic circuit that are able to be measured.

Particularly advantageously, the degree of wear W corresponding to the temporal profile I(t) and/or U(t) is retrieved from a calibration database. Such a calibration database, which may be for example a value table or a characteristic diagram, may for example be determined beforehand using one or more test valves of the same type in the context of a wear test on a test stand. This wear test may in particular be a dyno test. In the context of this test, the wear W may be periodically measured, for example, and it may be determined to what extent I(t) and U(t) have shifted from the new state of the valve at opening and/or at closure. The mass flow dm/dt and/or the leakage dm'/dt may also be detected in the context of the wear test and recorded in the calibration database. The mass flow dm/dt may be measured for example using a Coriolis meter or any other desired gas mass meter. The use of such a meter in normal operation of the engine is also conceivable, since more installation space is available for such additional devices in heavy-duty engines in comparison with automobile engines.

In one particularly advantageous refinement of the invention, the solenoid valve meters the fuel into an intake manifold of the fuel injection system. The leakage dm'/dt is detected by measuring the gas composition in the intake manifold. This measurement may be performed in particular by measuring the speed of sound c in the intake manifold. If no fuel is metered in, the intake manifold contains only air. A mixture containing even a small addition of fuel already greatly changes the speed of sound c. To measure the speed of sound c, it is possible to use for example an oscillation generator arranged in or on the intake manifold, such as for instance an ultrasound sensor or a tuning fork.

In a further particularly advantageous refinement of the invention, detected values of the opening duration $T_T$, of the mass flow dm/dt and/or of the leakage dm'/dt are archived. An estimation of the remaining lifetime of the solenoid valve is evaluated from the archived values. In this way, the user may for example obtain the information as to whether it is necessary to exchange the solenoid valve in the current servicing appointment or whether the solenoid valve is able to last until the next servicing on the engine.

The evaluation as well as the compensation and the correction of wear-induced deviations may be overseen by the existing engine controller, but also using additional electronics.

The invention also relates to a controller for operating a solenoid valve that is able to be actuated counter to a return force by an electromagnet. According to the invention, the controller comprises a calibration database that assigns a degree of wear W of the solenoid valve to a temporal profile I(t) of the current I flowing through the electromagnet and/or to a temporal profile U(t) of the voltage U applied to the electromagnet.

The invention furthermore also relates to a fuel injection system having at least one intake manifold and at least one solenoid valve for metering fuel into the intake manifold. According to the invention, a measurement apparatus for measuring the speed of sound c in the intake manifold is arranged in or on the intake manifold, downstream of the solenoid valve. This measurement apparatus comprises at least one oscillation generator in accordance with what is mentioned above.

Since the method is able to use all of the sensors that are already present on the engine and/or in the controller, it is able to be implemented largely or even completely through a software-based change of the procedures in the controller. Such software is a product that is able to be sold independently. The invention therefore also relates to a computer program product having machine-readable instructions that, when they are executed on a computer and/or on a controller, prompt the computer and/or the controller to execute a method according to the invention and/or to upgrade a controller according to the invention.

Furthermore, the calibration database able to be used to determine the wear also constitutes a product that is able to be sold together with the software for performing the method or else independently. The invention therefore also relates to a computer program product having a calibration database for a solenoid valve that is able to be actuated counter to a return force by an electromagnet. The calibration database assigns a degree of wear W of the solenoid valve to a temporal profile I(t) of the current I flowing through the electromagnet and/or to a temporal profile U(t) of the voltage U applied to the electromagnet.

BRIEF DESCRIPTION OF THE DRAWINGS

Further measures that improve the invention are illustrated in more detail below, with reference to figures, together with the description of the preferred exemplary embodiments of the invention.

DETAILED DESCRIPTION

Figure 1:
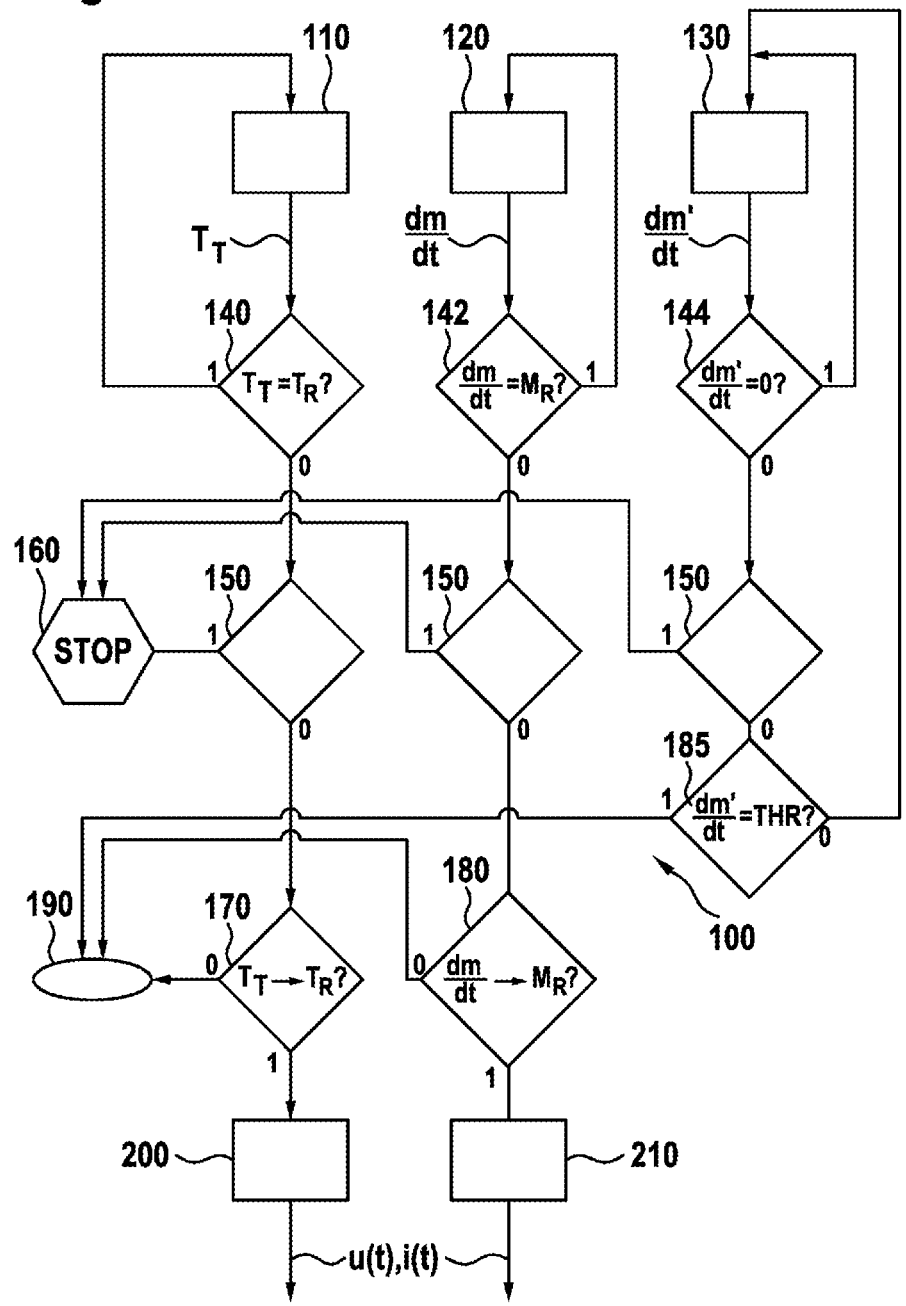
FIG. 1 shows an exemplary embodiment of the method 100 according to the invention.

In FIG. 1, the actual opening duration $T_T$, the mass flow dm/dt and/or the leakage dm'/dt of the solenoid valve 1 are determined in parallel steps 110, 120 and/or 130. In steps 140, 142 and 144, it is respectively checked whether $T_T$ corresponds to the reference value $T_R$, whether dm/dt corresponds to the reference value MR, and whether the leakage dm'/dt=0. If this is the case (truth value 1), there is branching back to the respective measurement 110, 120 or 130.

By contrast, if there is a deviation (truth value 0), then it is initially checked in step 150, which is identical for all three variables $T_T$, dm/dt and dm'/dt, whether there is a severe malfunction.

In the event of a severe malfunction (truth value 1), an emergency stop of the engine is prompted in step 160. Otherwise (truth value 0), it is checked in steps 170 and 180 whether the opening time TT, respectively the mass flow dm/dt, is able to be compensated or corrected by changing the driving of the solenoid valve 1. If this is possible (truth value 1), the appropriate measures are taken in steps 200 and 210; the solenoid valve 1 is driven by way of the appropriate voltage signal u(t) and/or the appropriate current signal i(t). A significant decisive factor is in this case the energization duration of the electromagnet 11. If compensation or correction is not possible (truth value 0), the user is informed in step 190 that maintenance is necessary.

A leakage dm'/dt is fundamentally not able to be compensated by changed driving of the solenoid valve 1. Therefore, a possible leakage that does not constitute a severe malfunction is merely investigated so as to determine whether it is greater than a predefined threshold value THR. If this is the case (truth value 1), the user is informed that maintenance is due in step 190. By contrast, if the threshold value THR is not exceeded (truth value 0), there is branching back to the determination of the leakage in step 130.

Instead of the variables $T_T$, dm/dt and dm'/dt, the respective raw data from which these variables were determined, that is to say for example characteristic variables of the temporal profiles I(t) and U(t), may also be compared directly with corresponding reference values.

Figure 2:
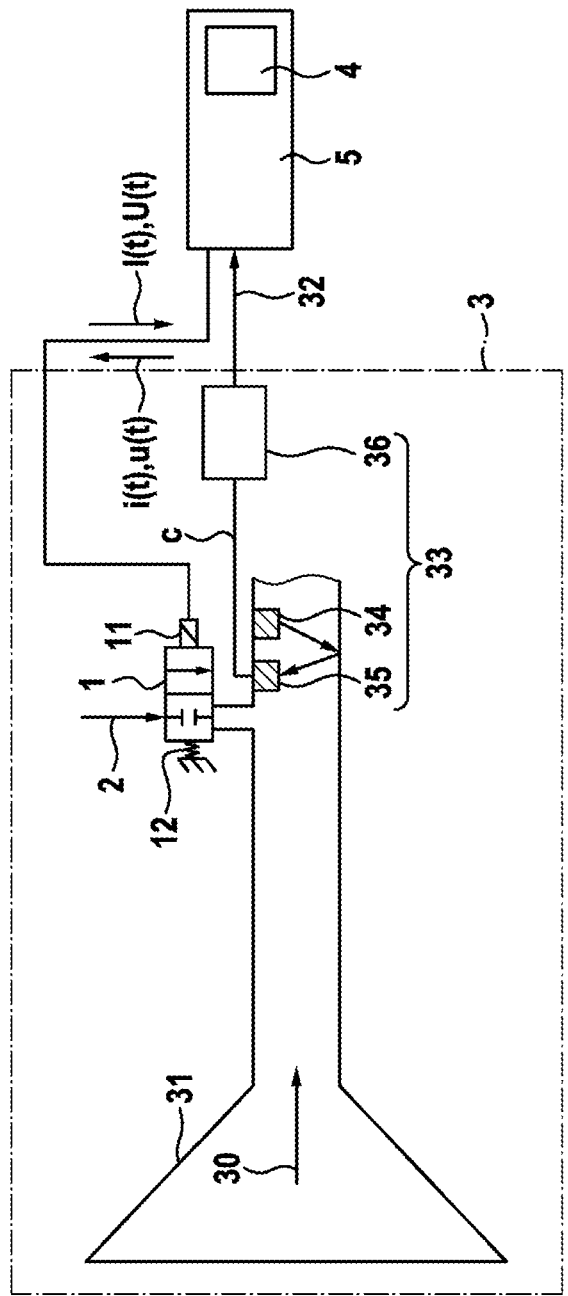
FIG. 2 shows an exemplary embodiment of the fuel injection system 3 according to the invention.

FIG. 2 schematically shows one exemplary embodiment of an injection system 3 for fuel 2 according to the invention. Air 30 is taken in through the intake manifold 31. To mix the air 30 thoroughly with fuel 2, the fuel 2 is metered in through the solenoid valve 1. The solenoid valve 1 is able to be actuated counter to a return force, which is exerted by a valve spring 12, by an electromagnet 11.

The controller 5 applies, to the electromagnet 11, a voltage that follows a temporal program u(t), and/or a current that follows a temporal program i(t). At the same time, the controller measures the temporal profile U(t) of the voltage U actually applied to the electromagnet 11 and/or the temporal profile I(t) of the current I actually flowing through the electromagnet 11. The controller 5 contains a calibration database 4 from which it retrieves the degree of wear W of the solenoid valve 1 that corresponds to the temporal profile I(t) and/or U(t).

To measure the leakage dm'/dt of the solenoid valve 1 in the closed state, the gas composition 32 in the intake manifold 31 is measured downstream of the site at which the solenoid valve 1 meters the fuel 2 into the intake manifold 31. To this end, a transmitter 34 and a receiver 35 for ultrasound are arranged in the intake manifold 31. The speed of sound c in the intake manifold 31 is able to be determined from the phase difference between the emitted and the received ultrasonic wave. The evaluation unit 36, which, together with the transmitter 34 and the receiver 35, forms the measurement apparatus 33, determines the sought gas composition 32 from the speed of sound c. The controller 5 in turn determines the sought leakage dm'/dt from this.

Figure 3:
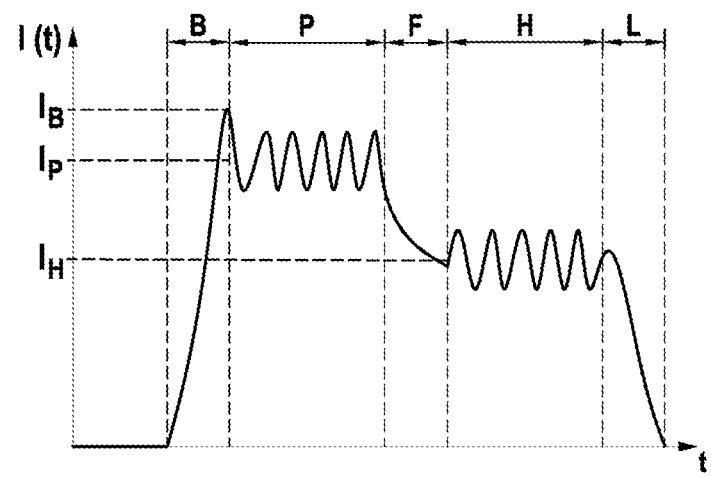
FIG. 3 shows exemplary temporal profiles u(t) of the voltage at the electromagnet 11, I(t) of the current response of the electromagnet 11 and h(t) of the stroke of the solenoid valve 1.
Figure 3:
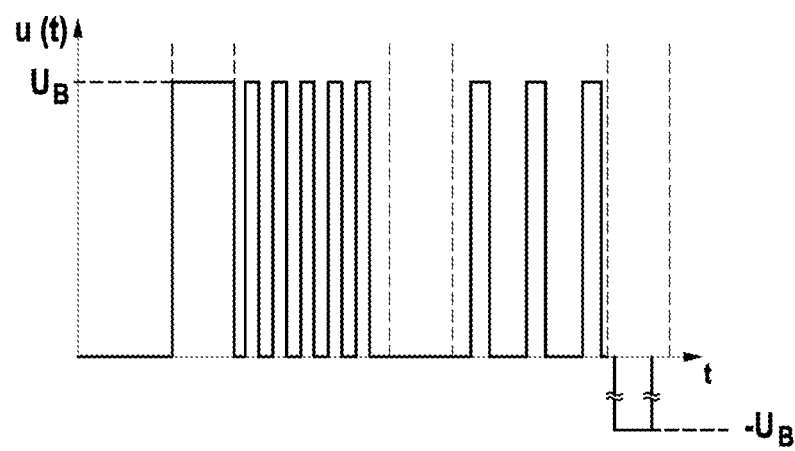
Figure 3:
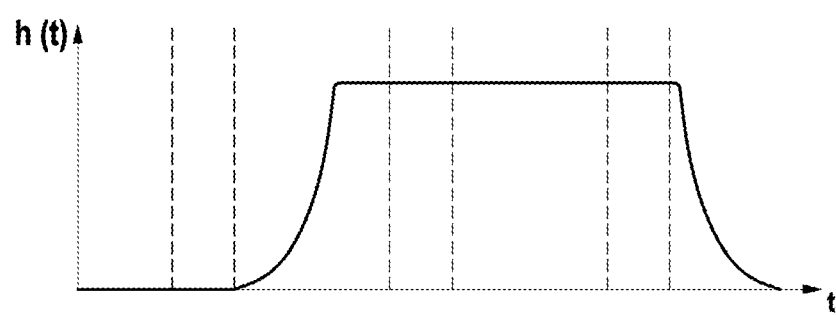

FIG. 3 shows, by way of example, the temporal profiles u(t) of the voltage applied to the electromagnet 11, I(t) of the current driven through the electromagnet 11 thereby and h(t) of the stroke of the solenoid valve 1 during an injection cycle.

To open the solenoid valve 1, a high boost voltage $U_B$ is initially applied in a boost phase B, such that the current I quickly increases to the boost current $I_B$. Next, in a pull-in phase P, the voltage is modulated in the form of a rectangular-wave signal between zero and $U_B$, such that the current I fluctuates around a temporal average value $I_P$. The solenoid valve 1 opens in the pull-in phase P; the stroke h(t) increases quickly and ultimately reaches its maximum level.

At a time at which the solenoid valve 1 is completely open, the electromagnet 11 is briefly switched into a freewheeling phase F in which no voltage is applied thereto. The current I subsides in this phase to a holding current level $I_H$.

To keep the solenoid valve 1 open, the voltage u(t) applied to the electromagnet 11 is again modulated between zero and $U_B$ in the holding phase H, but with a reduced ratio between switch-on duration and switch-off duration. The current I(t) accordingly now fluctuates around the lower temporal average value $I_H$.

To close the solenoid valve 1 at the end of the injection cycle, an extinguishing voltage pulse with reverse polarity is applied to the electromagnet 11 in the extinguishing phase L. As a result, the energy in the magnetic circuit of the solenoid valve 1 quickly subsides. This in turn means that the return force of the valve spring 12 prevails and the stroke h(t) of the solenoid valve 1 reduces until the solenoid valve 1 is ultimately completely closed.

The invention claimed is:

1. A method (100) for operating a solenoid valve (1) for metering a fuel (2) in a fuel injection system (3), wherein the solenoid valve is configured to be actuated counter to a return force (12) by an electromagnet (11), the method comprising:
   detecting, at at least one opening of the solenoid valve (1), either or both of a temporal profile I(t) of a current I flowing through the electromagnet (11) and a temporal profile U(t) of a voltage U applied to the electromagnet (11);
   evaluating, from either or both of the temporal profile I(t) and the temporal profile U(t), an opening time tON and a closure time tOFF of the solenoid valve (1);
   comparing an actual opening duration TT=tOFF−tON of the solenoid valve (1) with a reference value TR; and
   compensating or correcting a difference in the actual opening duration TT with respect to the reference value TR by changing the voltage temporal profile u(t) applied to the electromagnet (11) or the current temporal profile i(t) applied to the electromagnet (11).

2. The method (100) as claimed in claim 1, the method further comprising evaluating a degree of wear W of the solenoid valve (1), which influences a mass flow dm/dt through the solenoid valve (1), from either or both of the temporal profile I(t) and the temporal profile U(t).

3. The method (100) as claimed in claim 2, wherein the degree of wear W is retrieved from a calibration database (4).

4. The method (100) as claimed in claim 1, wherein the solenoid valve (1) meters fuel (2) into an intake manifold (31) of the fuel injection system (3) and a leakage dm'/dt of fuel (2) passing through the solenoid valve (1) is detected by measuring a gas composition (32) in the intake manifold (31).

5. The method (100) as claimed in claim 4, wherein the gas composition (32) is measured by measuring a speed of sound c in the intake manifold (31).

6. The method (100) as claimed in claim 1, the method further comprising evaluating an estimation of the remaining lifetime of the solenoid valve (1) from archived detected values of the opening duration TT.

7. A controller (5) for operating a solenoid valve (1) that is configured to be actuated counter to a return force (12) by an electromagnet (11), the controller comprising a calibration database (4) configured to assign a degree of wear W of the solenoid valve (1) to either or both of a temporal profile I(t) of a current I flowing through the electromagnet (11) and to a temporal profile U(t) of a voltage U applied to the electromagnet (11).

8. A fuel injection system (3) comprising
   at least one intake manifold (31); and at least one solenoid valve (1) for metering fuel (2) into the intake manifold (31), wherein a measurement apparatus (33) for measuring a speed of sound c in the intake manifold (31) is arranged in or on the intake manifold (31), downstream of the solenoid valve (1).

9. The fuel injection system (3) as claimed in claim 8, wherein the measurement apparatus (33) comprises at least one oscillation generator (34).

10. A non-transitory computer-readable medium storing instructions that, when executed by a processor of a computer, cause the computer to perform the method as claimed in claim 1.

11. The method (100) as claimed in claim 1 further comprising detecting, at at least one opening of the solenoid valve (1), a mass flow dm/dt through the solenoid valve (1) and comparing the mass flow dm/dt with a reference value MR.

12. The method (100) as claimed in claim 11, the method further comprising compensating or correcting a difference in the mass flow dm/dt with respect to the reference value MR by changing the voltage temporal profile u(t) applied to the electromagnet (11) or the current temporal profile i(t) applied to the electromagnet (11).

13. The method (100) as claimed in claim 11, the method further comprising evaluating an estimation of the remaining lifetime of the solenoid valve (1) from archived detected values of the mass flow dm/dt.

14. The method (100) as claimed in claim 1 further comprising detecting, in a closed state of the solenoid valve (1), a leakage dm'/dt of fuel (2) passing through the solenoid valve (1).

15. The method (100) as claimed in claim 14, the method further comprising evaluating an estimation of the remaining lifetime of the solenoid valve (1) from archived detected values of the leakage dm'/dt.

* * * * *